United States Patent [19]
Mallick et al.

[11] 4,385,251
[45] May 24, 1983

[54] FLUX SHIELD FOR AN INDUCTOR-ALTERNATOR MACHINE

[75] Inventors: John A. Mallick, Delanson; Eike Richter, Scotia, both of N.Y.; Thomas A. Nondahl, Milwaukee, Wis.

[73] Assignee: General Electric Company, Schenectady, N.Y.

[21] Appl. No.: 305,881

[22] Filed: Sep. 28, 1981

[51] Int. Cl.³ .................................................. H02K 31/00
[52] U.S. Cl. ........................................... 310/178; 322/48
[58] Field of Search .................. 310/178, 52, 166, 177, 310/171, 114, 159; 322/48; 318/253

[56] References Cited

U.S. PATENT DOCUMENTS

| | | | |
|---|---|---|---|
| 3,319,100 | 5/1967 | Erickson | 310/168 |
| 3,432,706 | 3/1969 | Beyersdorf et al. | 310/178 |
| 3,736,450 | 5/1973 | Emaldi | 310/178 |
| 3,816,780 | 6/1974 | Smith et al. | 310/52 |
| 4,032,807 | 6/1977 | Richter | 310/178 |

OTHER PUBLICATIONS

IEEE Transactions on Vehiclar Technology, vol. VT-26, No. 2, May 1977—"Development of a Hybrid Flywheel/Battery Drive System for Electric Vehicle Applications"–E. L. Lustenader, Robert H. Guess, Eike Richter and Fred G. Turnbull.

*Primary Examiner*—R. Skudy
*Attorney, Agent, or Firm*—William H. Steinberg; James C. Davis, Jr.; Marvin Snyder

[57] ABSTRACT

A homopolar inductor-alternator machine is constructed to have lower transient rectances by the incorporation of a current conducting ring concentric with the axis of the rotor and positioned on the rotor and/or the stator. The conducting ring helps prevent time varying fluxes from inducing eddy current flow in the high permeability rotor steel and unlaminated stator flux return path (back iron). The conducting ring acts upon the transient fluxes which occur in the DC flux path of the machine.

7 Claims, 7 Drawing Figures

FLUX SHIELD FOR AN INDUCTOR-ALTERNATOR MACHINE

BACKGROUND OF THE INVENTION

This invention relates to a homopolar inductor-alternator synchronous machine and more specifically to a homopolar inductor-alternator synchronous machine constructed to have lower transient or commutating reactances.

Inductor-alternator type machines have both laminated and unlaminated iron in their magnetic circuit structures. Under idealized steady-state balanced conditions, the laminated iron carries both AC and DC fluxes while the unlaminated iron carries only DC flux. The machine field excitation is applied along the unlaminated rotor iron and this iron and the outer unlaminated flux return path (motor frame) form part of the magnetic circuit of the field coil. Under steady-state operating conditions, the magnetic flux wave in the stator travels in synchronism with the rotor, and the reaction flux through the unlaminated iron is DC (not time varying). In a transient condition, the magnetic flux wave is time varying in the rotor, and thus there are time varying armature reaction fluxes which pass through the unlaminated iron parts. These time varying fluxes lead to induced eddy currents in the unlaminated iron, which have two effects: (1) the low conductivity of the iron leads to losses in the machine, (2) the high permeability of the iron causes the inductive reactance to such current flow to be large.

The solid rotor construction of inductor-alternator machines results in good high speed operating characteristics, and the machine is typically operated from a solid state power conditioner. The "on-off" nature of the output waveforms of these conditioners causes the machine to be in a transient state continually. The transient or commutating reactance of the machine when it is used with a power conditioner sets a limit on the power level and frequency of operation of the power conditioner, with a lower transient reactance being desirable. The high reactance of the eddy currents induced in the unlaminated iron sets a lower limit on the commutating reactance which can be achieved.

Conventional methods of reducing commutating reactance such as embedding amortisseur windings in the rotor are not suitable since the rotor pole tip velocity can be in excess of 490 ft./sec. (149 meters/sec.) and the copper windings embedded in the rotor would not withstand the resulting centrifugal forces.

It is an object of the present invention to provide a homopolar inductor-alternator machine having a flux shield for protection against transient fluxes.

It is a further object of the present invention to provide a homopolar inductor-alternator machine lower commutating reactance and losses.

SUMMARY OF THE INVENTION

A homopolar inductor-alternator machine is made up of a rotor and a stator assembly. The stator assembly has two stacks of stator laminations with slots on the inner surfaces of the stacks. The machine also has a DC field coil situated between the two stacks and an AC winding passing below the inner side of the field coil. A frame of flux conducting material encloses the field coil, the stator laminations and the AC winding. The rotor is supported in a spaced apart air gap defining relation with the stator assembly permitting rotation of the rotor relative to the stator during stator excitation. The transient reactances of the machine are lowered by the incorporation of a current conducting ring concentric with the axis of the rotor and positioned on the rotor and/or the stator. The conducting ring having a low permeability helps prevent time varying fluxes from inducing eddy current flow in the high permeability rotor steel and unlaminated stator flux return path (back iron) during transient conditions. The conducting ring carries eddy current and acts only upon the transient fluxes which occur in the DC flux path of the machine.

BRIEF DESCRIPTION OF THE DRAWING

The features of the invention believed to be novel are set forth with particularity in the appended claims. The invention itself, however, both as to organization and method of operation, together with further objects and advantages thereof, may best be understood with reference to the following description taken in conjunction with the accompanying drawing in which:

DETAILED DESCRIPTION OF THE DRAWING

Figure 1:
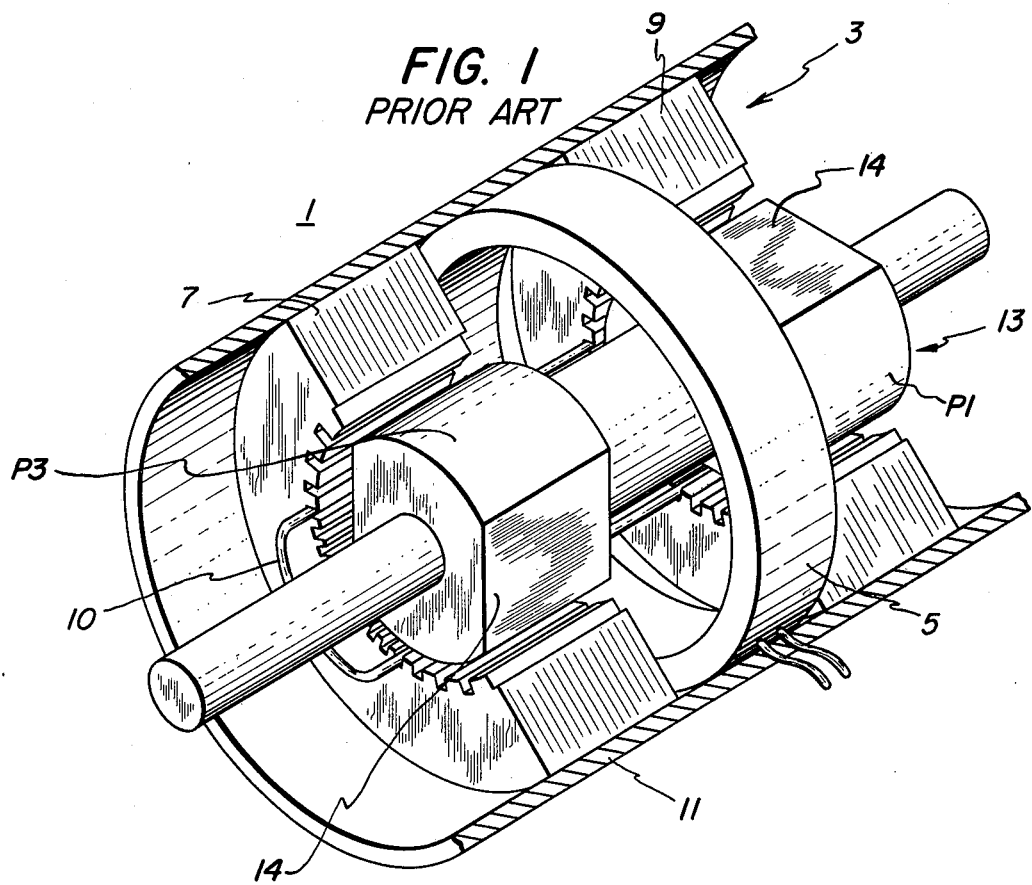
FIG. 1 shows a cutaway perspective view of a conventional homopolar inductor-alternator machine.

Referring now to FIG. 1, a conventional homopolar inductor-alternator machine 1 is shown. A stator assembly 3 contains a DC field coil 5 positioned between two axial stacks of stator laminations 7 and 9. Stator laminations 7 and 9 have axial slots on their inner surfaces for accepting an AC winding 10. Surrounding the AC winding and field windings is a frame 11 of the machine which also forms part of the stator assembly serving as an unlaminated outer DC flux return path (back iron). A rotor 13 is rotatably mounted in the stator assembly. The rotor has poles extending radially from a shaft near each end of the shaft. The poles are offset from one another by 180 electrical degrees. The particular rotor illustrated has four poles P1, P2, P3 and P4. P2 and P4 are not visible in FIG. 1. The rotor can be machined from a single piece of steel or the poles can be welded or brazed to a shaft. The poles can be laminated or just the pole shoes can be laminated.

When direct current is provided in the field coil 5, the current drives a magnetic flux through one stack of laminations 7 into one pole of the rotor 13, through the rotor axially, radially out a pole near the other end of the rotor, through the second stack of laminations 9 and circumferentially through the frame 11 of the motor to close the loop. Since the flux passing through the stacks is confined to a radial direction, the stacks can be laminated into disks to reduce losses. The back iron carries DC flux both circumferentially and in the axial direction and therefore cannot be laminated without an undue increase in reluctance. Large magnetic slots 14 between the poles of the rotor interrupt the flux at the air gap and cause the flux through the AC winding to pulsate. This in turn generates an AC voltage in these windings. The AC windings are located close to the air gap. In order to make the induced voltage in both stacks add properly, the magnetic rotor slots near both ends of the rotor are offset by one-half pole pitch.

Figure 2:
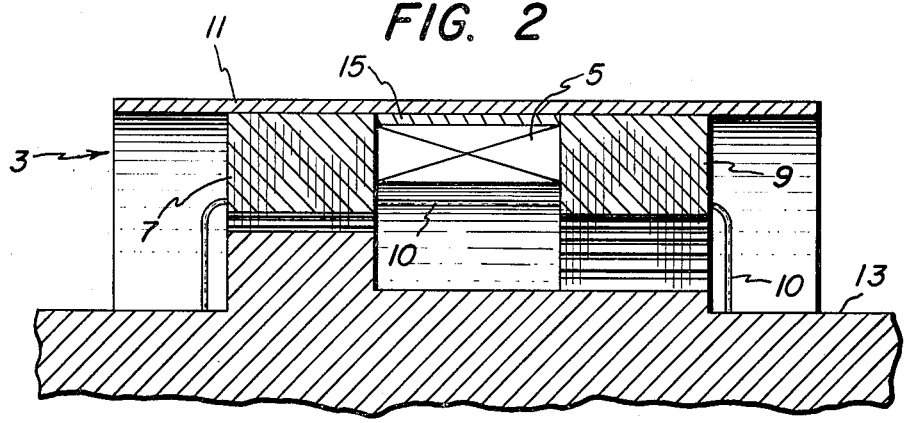
FIG. 2 is a partial cross section parallel to the axis of the rotor of an inductor-alternator machine employing one embodiment of the flux shield of the present invention.

Referring now to FIG. 2 a cross section parallel to the axis of a machine employing the invention is shown having a flux shield which is a ring of highly conductive sheet material 15, such as copper, positioned around the DC field winding 5 and concentric with the rotor axis 13. The ring of high conductance sheet material is supported by the AC winding. The sheet of conductive material links the same flux as the field coil 5 but the single turn sheet has much lower leakage reactance than the multiturn field coil and thus helps provide better flux screening in a transient situation.

Figure 3:
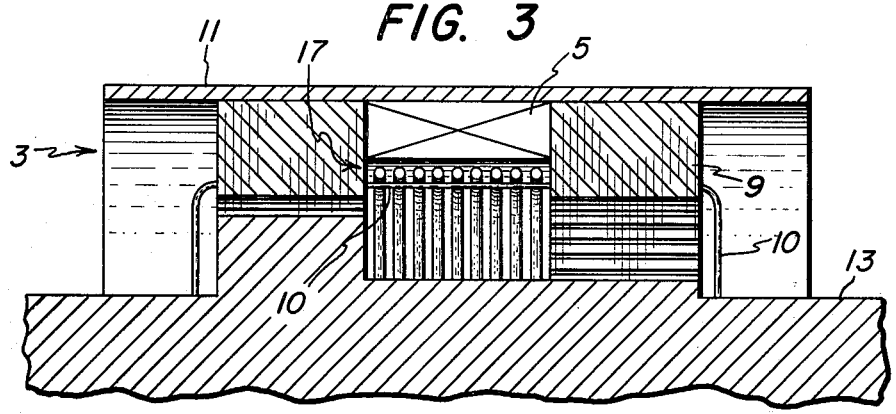
FIG. 3 shows a partial cross section parallel to the axis of the rotor of an inductor-alternator machine employing a second embodiment of the flux shield of the present invention.

Referring now to FIG. 3, another embodiment of the flux shield is shown. A row of single turn shorted coils 17 is shown surrounding the AC windings 10 and supported thereby. The transient flux is as described for FIG. 2, but the smaller cross-sectional area of the coils gives improved protection against additional eddy currents due to the close proximity of the coils to the AC windings.

Figure 4:
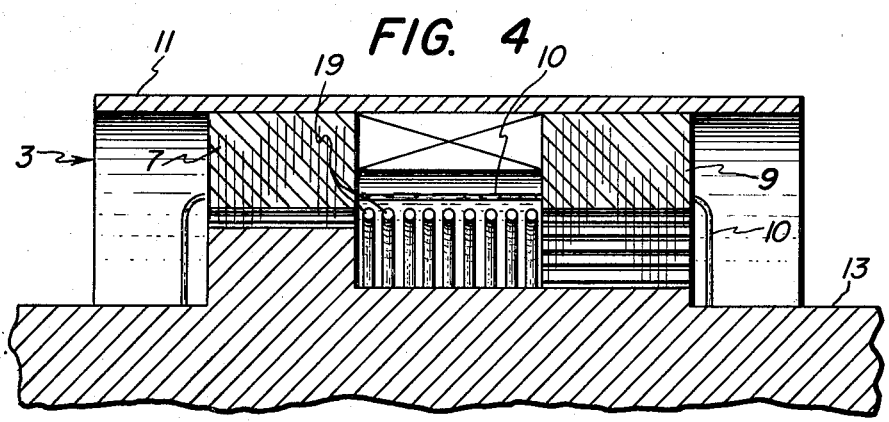
FIG. 4 shows a partial cross section parallel to the axis of the rotor of an inductor-alternator machine employing a third embodiment of the flux shield of the present invention.

Referring now to FIG. 4, another embodiment of the flux shield is shown. A flux ring shield is shown concentric with the rotor axis. The flux rings 19 are located inside the AC winding and are supported by AC winding. This arrangement is preferable where limited temperature rise of the ring is desired since the relative cooling of the ring is greater closer to the rotor.

Figure 5A:
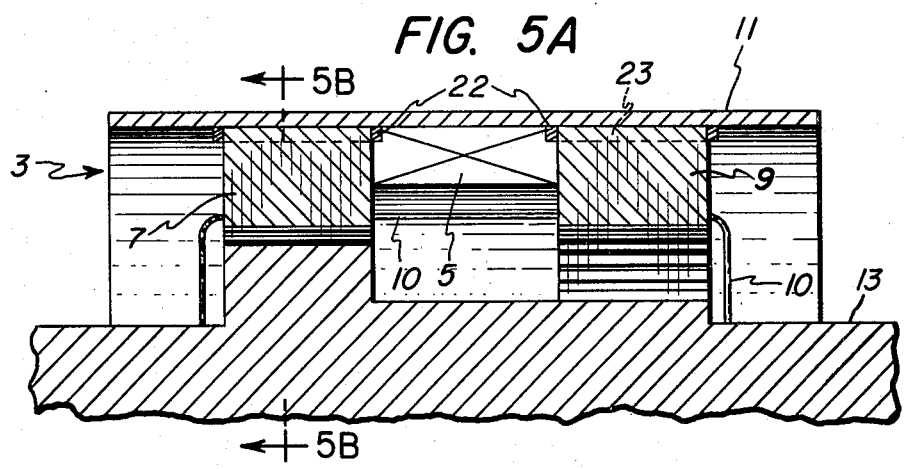
FIGS. 5A and 5B show a cross section parallel and perpendicular to the axis of the rotor respectively employing a fourth embodiment of the flux shield of the present invention.
Figure 5B:
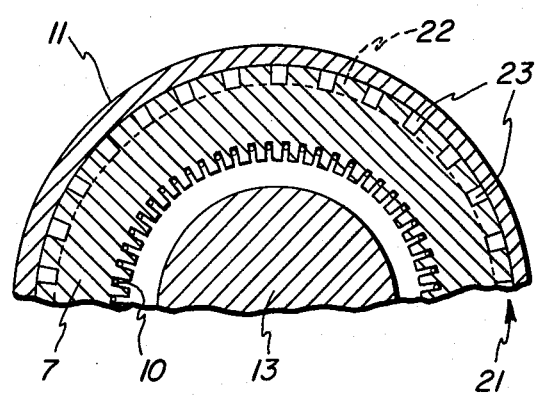

Referring now to FIGS. 5A and 5B, a flux shield 21 is shown for each side of the stator stacks and comprises two concentric copper rings 22 one on each side of each stator stack. The ring pair for each stack are cross-connected through axial copper connections 23 which are set into slots on the outer diameter of the stator punching. The copper rings 22 and copper connections form a cylindrical cage. This allows the laminated stator iron to be mated firmly to the outer DC flux return material, reducing the effective air gap when compared with placing a sheet type of shield circumferentially around the stator laminations.

Figure 6:
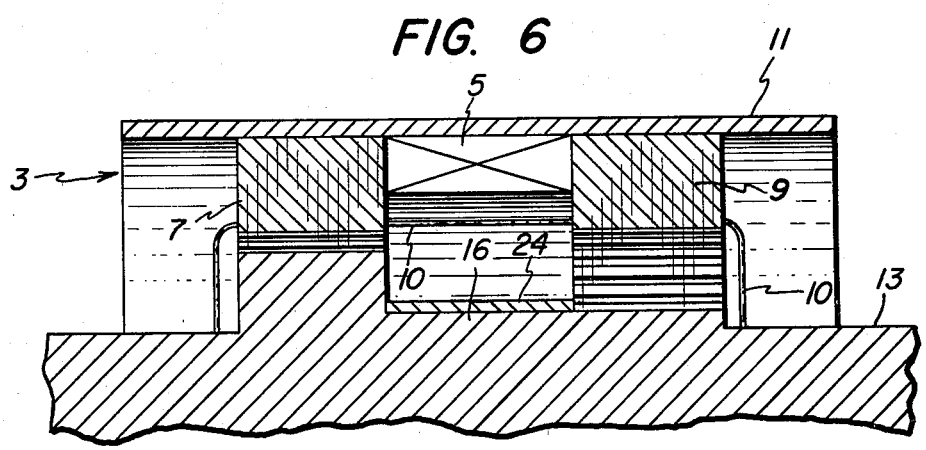
FIG. 6 shows a partial cross section parallel to the axis of the rotor of an inductor-alternator machine employing a fifth embodiment of the flux shield of the present invention.

Referring now to FIG. 6, another embodiment of the flux shield is shown which includes a copper band 24 placed around the rotor 13 shaft portion 16 between the pole pieces. Because the flux passing through the DC outer flux return path must pass axially through the shaft, the rotor ring 24 acts to prevent AC fluxes from taking this path. The rotor ring has lower reactance because of the large surrounding air space and will lower the transient reactance by shielding gross flux linkages rather than by local flux shielding. The rotor ring also has a small inductance because of its smaller diameter compared to the other flux shields. There is no increase in air gap length over the regular inductor-alternator machine.

The flux shields of the invention which are all concentric with the rotor axis, help to maintain constant flux in the machine during transient conditions. Eddy currents which are induced in these shields cause losses but these losses are much less than losses which would occur if the AC flux was carried by the unlaminated frame or solid iron rotor.

Lower commutating reactance will allow higher frequency of operation of the machine being supplied from a power converter, with reduced converter losses. The power factor angle of power supplied by the converter will improve. These improvements will overcome the disadvantage of increased spike voltages in the converter and machine due to the decreased commutating reactance.

The foregoing describes a homopolar inductor-alternator machine that has a DC flux circuit shielded from transient fluxes thereby lowering commutating reactance as well as reducing losses.

While the invention has been particularly shown and described with reference to several preferred embodiments thereof, it will be understood by those skilled in the art that various changes in form and details may be made therein without departing from the spirit and scope of the invention.

What is claimed is:

1. A homopolar inductor-alternator machine comprising:
    a rotor,
    a stator assembly including two stacks of stator laminations, said stacks having slots on their inner surfaces;
    a DC field coil between said two stacks;
    an AC winding located in said stator slots and passing below the inner side of said field coil;
    a frame of flux conducting material enclosing said field coil, said stator laminations and the AC winding;
    means for supporting said rotor in a spaced-apart air gap defining relation with the stator assembly and for permitting rotation of the rotor relative to the stator during stator excitation; and
    a current conducting ring concentric with the axis of said rotor, said conducting ring having a lower permeability than said rotor and said frame so that the commutating reactance of the homopolar inductor-alternator is reduced during transient conditions.

2. The inductor-alternator machine of claim 1 wherein said current conducting ring comprises:
    a sheet of conducting material positioned between said field coil and said motor frame forming a single turn coil concentric with the axis of said rotor.

3. The inductor-alternator machine of claim 1 wherein said current conducting ring comprises a plurality of single turn shorted coils between said AC winding and said field coil, said plurality of single turn shorted coils supported by said AC winding and concentric with the axis of said rotor.

4. The inductor-alternator machine of claim 1 wherein said current conducting ring comprises:
    a plurality of single turn shorted coils concentric with the axis of the rotor and located between the air gap and said AC winding, said conducting rings being supported by said AC winding and positioned between said laminated stacks.

5. The inductor-alternator machine of claim 1 wherein said current conducting ring comprises:
    a ring on either side of each of said stator stacks and surrounding said stacks; and axially extending conducting means for connecting the pair of rings on each stator stack to form a cage configuration permitting direct contact between each stack and said frame, said rings and said axially extending conducting means located in slots in the outer surface of said stacks.

6. The inductor-alternator of claim 1 wherein said conducting ring comprises copper.

7. A homopolar inductor-alternator machine comprising:
 a rotor with poles spaced about and extending radially from a shaft near each end of said shaft;
 a stator assembly including two stacks of stator laminations, said stacks having slots on their inner surfaces;
 a DC field coil situated between said two stacks;
 an AC winding located in said stator slots and passing below the inner side of said field coil;
 a frame of flux conducting material enclosing said field coil, said stator laminations and the AC winding;
 means for supporting said rotor in a spaced-apart air gap defining relation with the stator assembly and for permitting rotation of the rotor relative to the stator during stator excitation; and
 a current conducting ring surrounding said shaft, said ring positioned between said poles and having a lower permeability than said rotor so that the commutating reactance of the homopolar inductor-alternator is reduced during transient conditions.

* * * * *